US012809451B2

(12) United States Patent
Narikawa

(10) Patent No.: US 12,809,451 B2
(45) Date of Patent: Nov. 24, 2026

(54) SUPPORT DEVICE, SUPPORT SYSTEM, AND SUPPORT METHOD

(71) Applicant: Tokyo Electron Limited, Tokyo (JP)

(72) Inventor: Kenichi Narikawa, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 19/045,187

(22) Filed: Feb. 4, 2025

(65) Prior Publication Data

US 2025/0181142 A1 Jun. 5, 2025

Related U.S. Application Data

(63) Continuation of application No. PCT/JP2023/027514, filed on Jul. 27, 2023.

(30) Foreign Application Priority Data

Aug. 9, 2022 (JP) ................................ 2022-127190

(51) Int. Cl.

| | |
|---|---|
| ***G09G 5/00*** | (2006.01) |
| ***G06F 3/01*** | (2006.01) |
| ***G06F 3/14*** | (2006.01) |
| ***G06T 19/00*** | (2011.01) |

(52) U.S. Cl.

CPC ................ *G06F 3/011* (2013.01); *G06F 3/14* (2013.01); *G06T 19/00* (2013.01)

(58) Field of Classification Search

CPC ............. G06F 3/011; G06F 3/14; G06T 19/00

USPC .......................................................... 345/156

See application file for complete search history.

(56) References Cited

U.S. PATENT DOCUMENTS

| | | | | |
|---|---|---|---|---|
| 9,810,905 | B2 | 11/2017 | Kodama et al. | |
| 2014/0240484 | A1 | 8/2014 | Kodama et al. | |
| 2019/0129675 | A1 | 5/2019 | Ochiai | |
| 2019/0147655 | A1* | 5/2019 | Galera | G06T 15/20 345/419 |
| 2019/0371279 | A1* | 12/2019 | Mak | G09G 5/373 |
| 2020/0117898 | A1* | 4/2020 | Tian | G06F 3/04815 |
| 2020/0257278 | A1* | 8/2020 | Zhao | H04L 41/0631 |
| 2021/0029497 | A1* | 1/2021 | Hishinuma | G06T 7/70 |

FOREIGN PATENT DOCUMENTS

| | | | |
|---|---|---|---|
| JP | 2014-164482 | A | 9/2014 |
| WO | WO 2017/169276 | A1 | 10/2017 |

OTHER PUBLICATIONS

PCT International Search Report, PCT Application No. PCT/JP2023/027514, Sep. 26, 2023, five pages.

* cited by examiner

*Primary Examiner* — Jennifer T Nguyen

(74) *Attorney, Agent, or Firm* — Fenwick & West LLP

(57) ABSTRACT

The present disclosure relates to a support device for supporting an operation performed on an equipment. The support device comprises: a receiving part configured to receive position information related to a position of the equipment, which is transmitted from a device of an operator who performs the operation on the equipment; an identifying part configured to identify the equipment based on the position information received by the receiving part; and a transmitting part configured to transmit support information suitable for supporting the operation for the equipment to the device of the operator who performs the operation on the equipment identified by the identifying part.

11 Claims, 5 Drawing Sheets

SUPPORT DEVICE, SUPPORT SYSTEM, AND SUPPORT METHOD

CROSS-REFERENCE TO RELATED APPLICATIONS

This application is a bypass continuation application of International Application No. PCT/JP2023/027514 having an international filing date of Jul. 27, 2023 and designating the United States, the International Application being based upon and claiming the benefit of priority from Japanese Patent Application No. 2022-127190 filed on Aug. 9, 2022, each of which is hereby incorporated by reference in its entirety.

TECHNICAL FIELD

The present disclosure relates to a support device, a support system, and a support method.

BACKGROUND

Japanese Laid-open Patent Publication No. 2014-164482 discloses a support information display method for providing information required by an operator, such as a field engineer who performs maintenance on an inspection equipment or a manufacturing equipment (hereinafter, simply referred to as "equipment") or information that the operator needs to know. In the support information display method, first, an image of a maintenance target part of the equipment is acquired using a camera of a head-mounted display worn by the operator. Next, support information related to the maintenance target part in the image is estimated from a database and becomes a visualized image. Then, the visualized image is displayed on the head-mounted display, thereby allowing the operator to visually recognize the support information.

SUMMARY

The technique of the present disclosure can appropriately support an operation performed on the equipment.

The present disclosure relates to a support device for supporting an operation performed on an equipment. The support device comprises: a receiving part configured to receive position information related to a position of the equipment, which is transmitted from a device of an operator who performs the operation on the equipment; an identifying part configured to identify the equipment based on the position information received by the receiving part; and a transmitting part configured to transmit support information suitable for supporting the operation for the equipment to the device of the operator who performs the operation on the equipment identified by the identifying part.

DETAILED DESCRIPTION

In the technique of Japanese Laid-open Patent Publication NO. 2014-164482 described above, it is assumed that an image of a maintenance target part of the equipment is acquired using a camera of a head-mounted display worn by an operator such as a field engineer or the like.

However, when the equipment having a maintenance target part is installed in a customer's factory, for example, the acquisition of an image of the equipment by a camera may be prohibited for security reasons. In this case, the maintenance target part cannot be estimated, so that it may be difficult to appropriately acquire support information.

To this end, the technique of the present disclosure does not require the acquisition of an image of the equipment in the case of performing an operation such as maintenance on the equipment, and can appropriately support the operation.

Hereinafter, embodiments of the technique of the present disclosure will be described with reference to the accompanying drawings. However, the configuration described in the following embodiments is merely an example, and the present disclosure is not limited to such a configuration. For example, each part included in such a configuration can be replaced with any other part that can perform the same function. Further, any component may be added.

Figure 1:
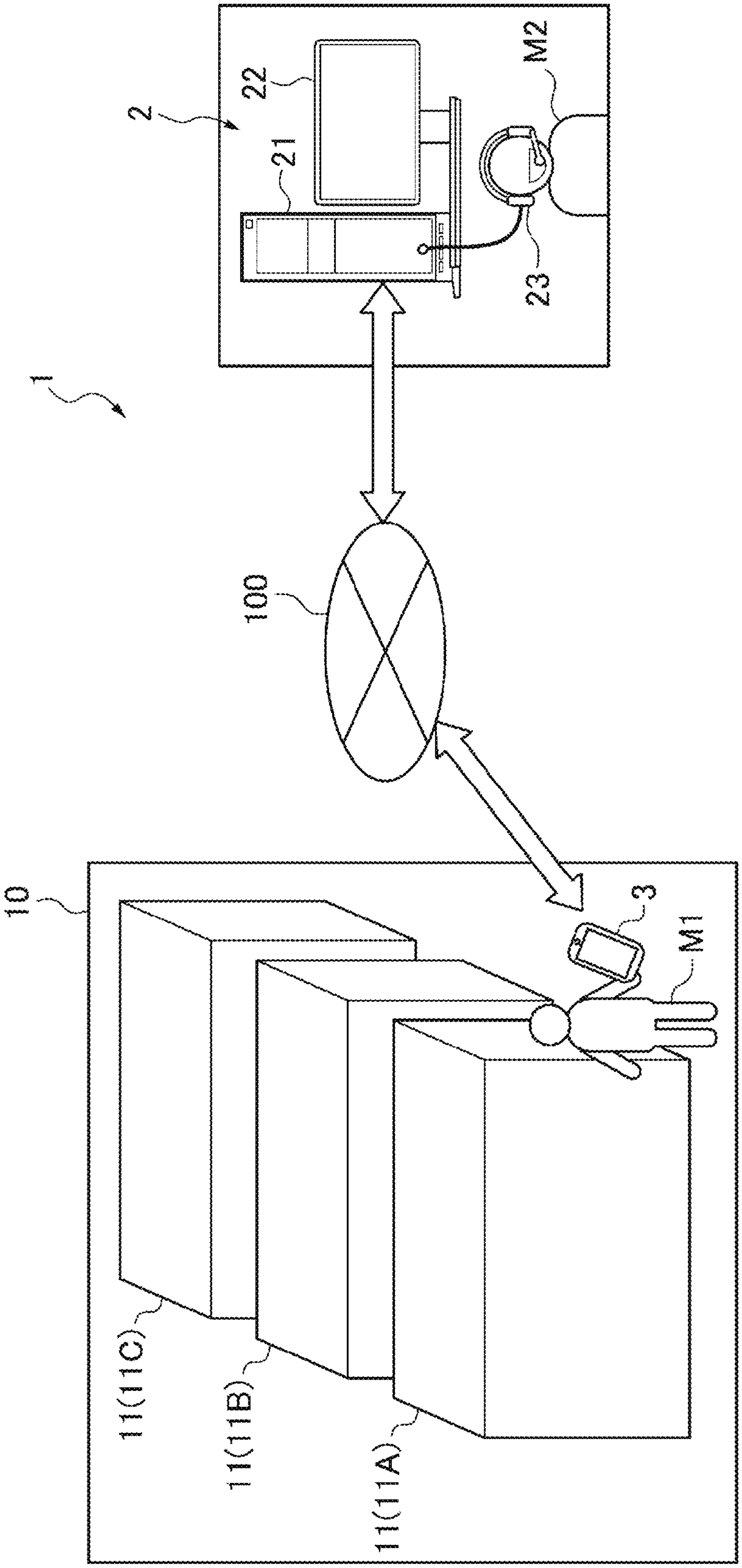
FIG. 1 is a schematic diagram schematically showing a configuration of a support system as an embodiment of the technique of the present disclosure.

FIG. 1 is a schematic diagram showing a configuration of a support system as an embodiment of the technique of the present disclosure. A support system 1 shown in FIG. 1 includes a support device 2 and a mobile terminal 3 that can communicate with each other via an external information communication network 100. The support system 1 allows a supporter M2 to remotely support an operator (worker) M1, such as a field engineer, who works in a factory 10. Further, the support device 2 is operated by the supporter M2. Meanwhile, the mobile terminal 3 is a device held by the operator M1 in the factory 10, and is operated by the operator M1. A plurality of equipments 11 are arranged side by side in the factory 10. Although three equipments 11 are arranged in the configuration shown in FIG. 1, the present disclosure is not limited thereto. The three equipments 11 may be referred to as "equipment 11A," "equipment 11B," and "equipment 11C" when viewed from the front side of FIG. 1. Further, in the present embodiment, the equipment 11 is a prober (inspection device) used for electrical inspection of semiconductor devices formed on a wafer, for example. In the present embodiment, the operation performed by the operator M1 in the factory 10 is the operation for the equipment 11A among the equipments 11A to 11C. The operation for the equipment 11A is the maintenance of the equipment 11A, for example.

Figure 2:
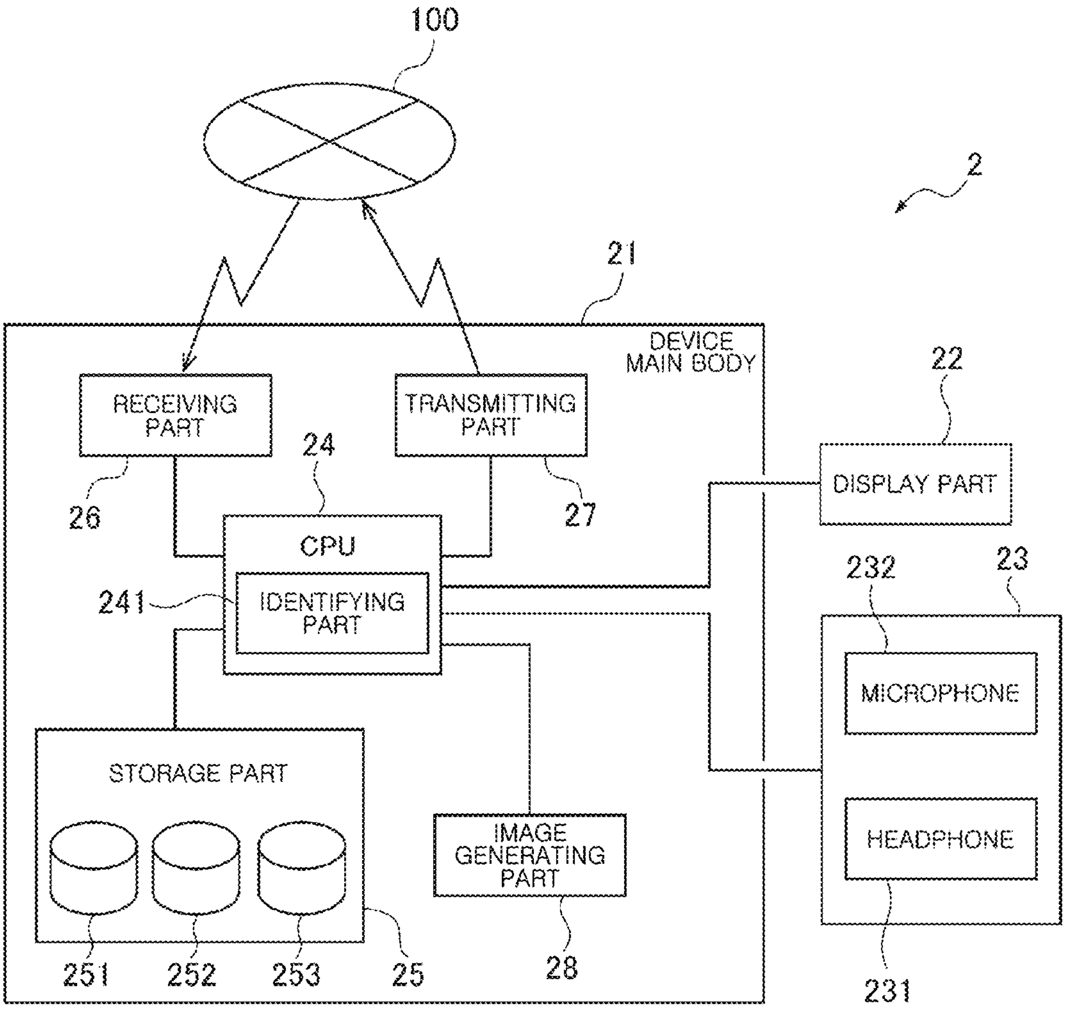
FIG. 2 is a block diagram showing an example of a hardware configuration of a support device of the support system shown in FIG. 1.
Figure 3:
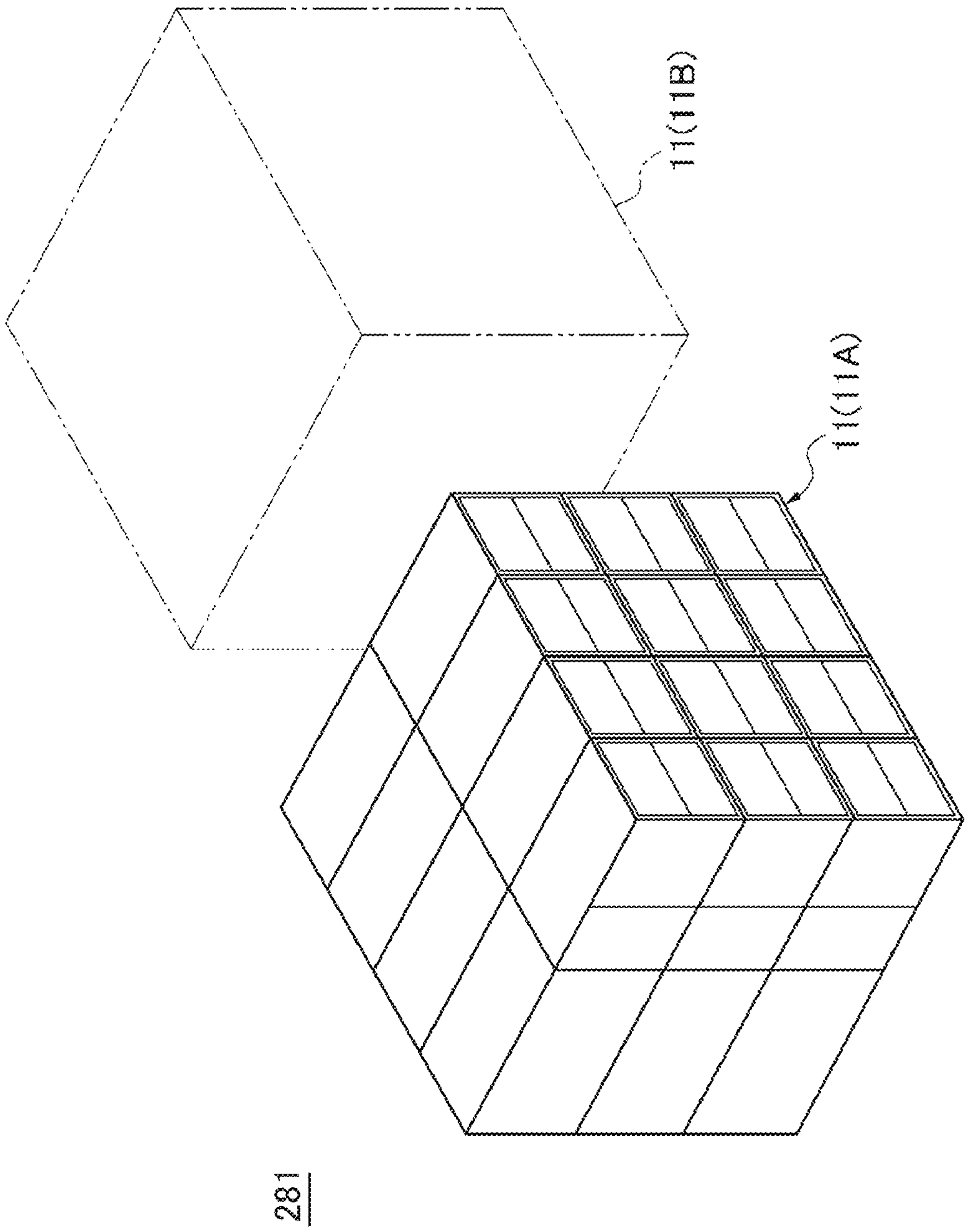
FIG. 3 shows an example of a virtual space image generated by the support device shown in FIG. 2.

FIG. 2 is a block diagram showing an example of a hardware configuration of a support device of the support system shown in FIG. 1. FIG. 3 is an example of a virtual space image displayed in the support system shown in FIG. 1. The support device 2 (support method) can support the operation performed by the operator M1. As shown in FIG. 2, the support device 2 includes a device main body 21, a display part 22, and a headset 23 that are connected to communicate with each other. The device main body 21 includes a central processing unit (CPU) 24, a storage part 25, a receiving part 26, a transmitting part 27, and an image generating part 28. In the present embodiment, a desktop personal computer is used as the device main body 21 (see FIG. 1). However, the present disclosure is not limited thereto, and a notebook personal computer or a tablet terminal can be used, for example. Further, the display part 22 is not particularly limited, and may be an organic electroluminescence (EL) display, a liquid crystal display, or the like, for example.

The CPU 24 is a controller that controls the storage part 25, the receiving part 26, the transmitting part 27, the image generating part 28, the display part 22, and the headset 23.

The storage part 25 stores, in advance, support information 251 suitable for supporting the operation for each equipment 11, arrangement information 252 of each equipment 11 in the factory 10, and specification information 253 indicating the specifications of each equipment 11. The support information 251 is information suitable for maintenance, and includes at least one of a manual for each equipment 11 and a past maintenance history (history) of each equipment 11. Further, the manual for each equipment 11 includes at least one of an operation procedure manual and a specification (design document) for each equipment 11. The maintenance history includes a past defect history of each equipment 11 and a history of the elimination measures that have eliminated the defect. In response to a request (demand) from the operator M1, the supporter M2 can select the most suitable support information 251 from the manual and maintenance history of the equipment 11 identified by an identifying part 241 to be described later, and provide it to the operator M1 (see FIG. 5).

The arrangement information 252 is obtained from a customer who owns the factory 10, for example, when the equipment 11 is delivered to the factory 10. The specification information 253 includes, for example, three-dimensional CAD data as design information of each equipment 11. The specification information 253 also includes specification information of the equipment 11 of standard specifications, and other information on devices added to the equipment 11 for the customer and modified contents. The specification information 253 is obtained from any one of a developer, a designer, or a manufacturer of each equipment 11, for example. Further, the storage part 25 stores various programs executed by the CPU 24 in advance.

The receiving part 26 receives position information 30 on the position of the equipment 11 (receiving process). The position information 30 is transmitted from the mobile terminal 3 (see FIG. 5). The position information 30 may also include position information of the factory 10. The position information of the factory 10 may be obtained, for example, from a map application that is a web mapping platform.

The transmitting part 27 transmits the support information 251 to the mobile terminal 3 held by the operator M1 (transmitting process). The transmitting part 27 can also transmit a virtual space image 281 (see FIG. 3 and FIG. 5) generated by the image generating part 28.

The CPU 24 has a function as the identifying part 241 for identifying the equipment 11 to be subjected to maintenance (identifying process). In the present embodiment, the equipment 11 to be subjected to maintenance is the equipment 11A. The identifying part 241 identifies the equipment 11A based on the position information 30 received by the receiving part 26 and the arrangement information 252 stored in the storage part 25.

However, as described above, in the factory 10, for security reasons, the acquisition of images of the equipment 11A by a camera may be prohibited. In this case, the identifying part 241 cannot use images of the equipment 11A to identify the equipment 11A. Further, although it depends on types of the equipment 11A, when the equipment 11A is a prober having a plurality of cells (inspection rooms), it has a large size with a width and depth of about 2000 mm to 4000 mm. Therefore, in the support system 1, if the operator M1 holding the mobile terminal 3 is in the vicinity of the equipment 11A, the equipment 11A can be sufficiently identified based on the position information 30 from the mobile terminal 3 and the arrangement information 252 (the same applies to the equipments 11B and 11C). Since a large equipment is used in the support system 1 as described above, the characteristic accuracy of the identifying part 241 is ensured sufficiently based only on the position information 30 from the mobile terminal 3.

The image generating part 28 generates the virtual space image 281 (see FIGS. 3 and 5) that imitates the equipment 11 in the actual factory 10 based on the position information 30, the arrangement information 252, and the specification information 253. The image generating part 28 generates the virtual space image 281 shown in FIG. 3 based on the position information 30, the arrangement information 252, and the specification information 253. In the virtual space image 281, specific parts of a three-dimensional appearance image of the equipment 11A are shown with solid lines. Here, "specific parts" allow the maintenance work to be supported sufficiently. In addition, next to the equipment 11A in the virtual space image 281, a three-dimensional appearance image of the equipment 11B is simplified and shown with dashed double-dotted lines, for example. Further, the position of the operator M1 may be displayed in the virtual space image 281.

The display part 22 displays the virtual space image 281 generated by the image generating part 28, for example. Accordingly, the supporter M2 can provide the support information 251 to the operator M1 while monitoring the virtual space image 281. The headset 23 is worn on the head of the supporter M2. The headset 23 has a headphone 231 and a microphone 232. Accordingly, the supporter M2 can talk to the operator M1.

Figure 4:
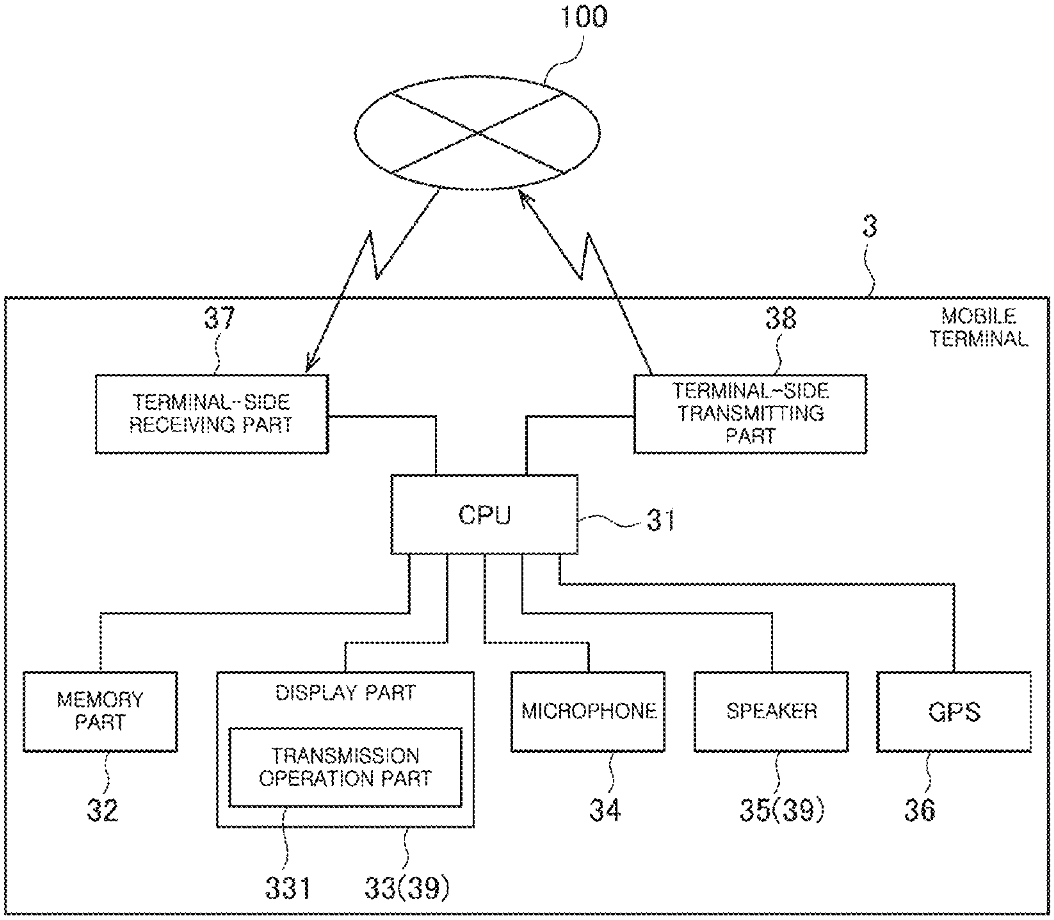
FIG. 4 is a block diagram showing an example of a hardware configuration of a mobile terminal of the support system shown in FIG. 1.

FIG. 4 is a block diagram showing an example of a hardware configuration of a mobile terminal included in the support system shown in FIG. 1. As shown in FIG. 4, the mobile terminal 3 includes a central processing unit (CPU) 31, a memory part 32, a display part 33, a microphone 34, a speaker 35, a GPS 36, a terminal-side receiving part 37, and a terminal-side transmitting part 38. The mobile terminal 3 is not particularly limited, and may be a smartphone, a tablet terminal, a notebook personal computer, or the like, for example.

The CPU 31 is a controller that controls the memory part 32, the display part 33, the microphone 34, the speaker 35, the GPS 36, the terminal-side receiving part 37, and the terminal-side transmitting part 38. Various programs executed by the CPU 31 are stored in the memory part 32 in advance. In the support system 1, the position information of the mobile terminal 3 is used as the position information 30 related to the position of the equipment 11. The position information of the mobile terminal 3 is the position information acquired from the GPS 36. Accordingly, the position information 30 can be acquired as the accurate position information.

The terminal-side transmitting part 38 transmits the position information 30 to the receiving part 26 of the support device 2. A position information transmitting application is installed in the mobile terminal 3. Further, a transmission operation part (operation part) 331 for performing a transmission operation of transmitting the position information 30 from the terminal-side transmitting part 38 is displayed as an icon, for example, on the display part 33. The operator M1 can transmit the position information 30 at any timing by operating the transmission operation part 331.

The terminal-side receiving part 37 receives the support information 251 from the transmitting part 27 of the support device 2. The terminal-side receiving part 37 can also receive the virtual space image 281 transmitted from the transmitting part 27.

The display part 33 displays the support information 251 and the virtual space image 281 received by the terminal-side receiving part 37, for example. In the present embodiment, the display part 33 functions as a notifying part 39 that notifies the support information 251 in the form of image. The speaker 35 can output the voice of the supporter M2 collected by the microphone 232 of the support device 2, for example. Accordingly, the operator M1 can hear the voice of the supporter M2. Further, the speaker 35 can output the support information 251 received by the terminal-side receiving part 37 in the form of voice. Similarly to the display part 33, the speaker 35 functions as the notifying part 39 that notifies the support information 251 in the form of voice. The notifying part 39 allows the operator M1 to accurately recognize the support information 251. Further, the notifying part 39 does not necessarily notify the support information 251 in the form of both image and voice, and may notify the support information 251 in the form of either image or voice. The microphone 34 collects the voice of the operator M1, for example. The voice is outputted from the headphones 231 of the support device 2, and can be heard by the supporter M2.

Further, during the maintenance of the equipment 11A, the operator M1 may not stay in one location, but may move to a plurality of locations around the equipment 11A. In this case, the position information 30 also changes. At this time, it is preferable that the direction of the equipment 11A in the virtual space image 281 changes in response to the movement of the operator M1. Therefore, the mobile terminal 3 may be configured to transmit the position information 30 periodically (for example, every 60 seconds to 120 seconds) from the start of the maintenance to the end of the maintenance. At this time, in the support device 2, the virtual space image 281 that follows the movement of the operator M1 is generated in the image generating part 28 whenever the position information 30 is received. Accordingly, the supporter M2 can provide the support information 251 corresponding to the maintenance position while monitoring the virtual space image 281 that follows the movement of the operator M1. Further, in the mobile terminal 3, a start operation part that operates when the maintenance is started and an end operation part that operates when the maintenance is ended are provided as icons on the display part 33.

Figure 5:
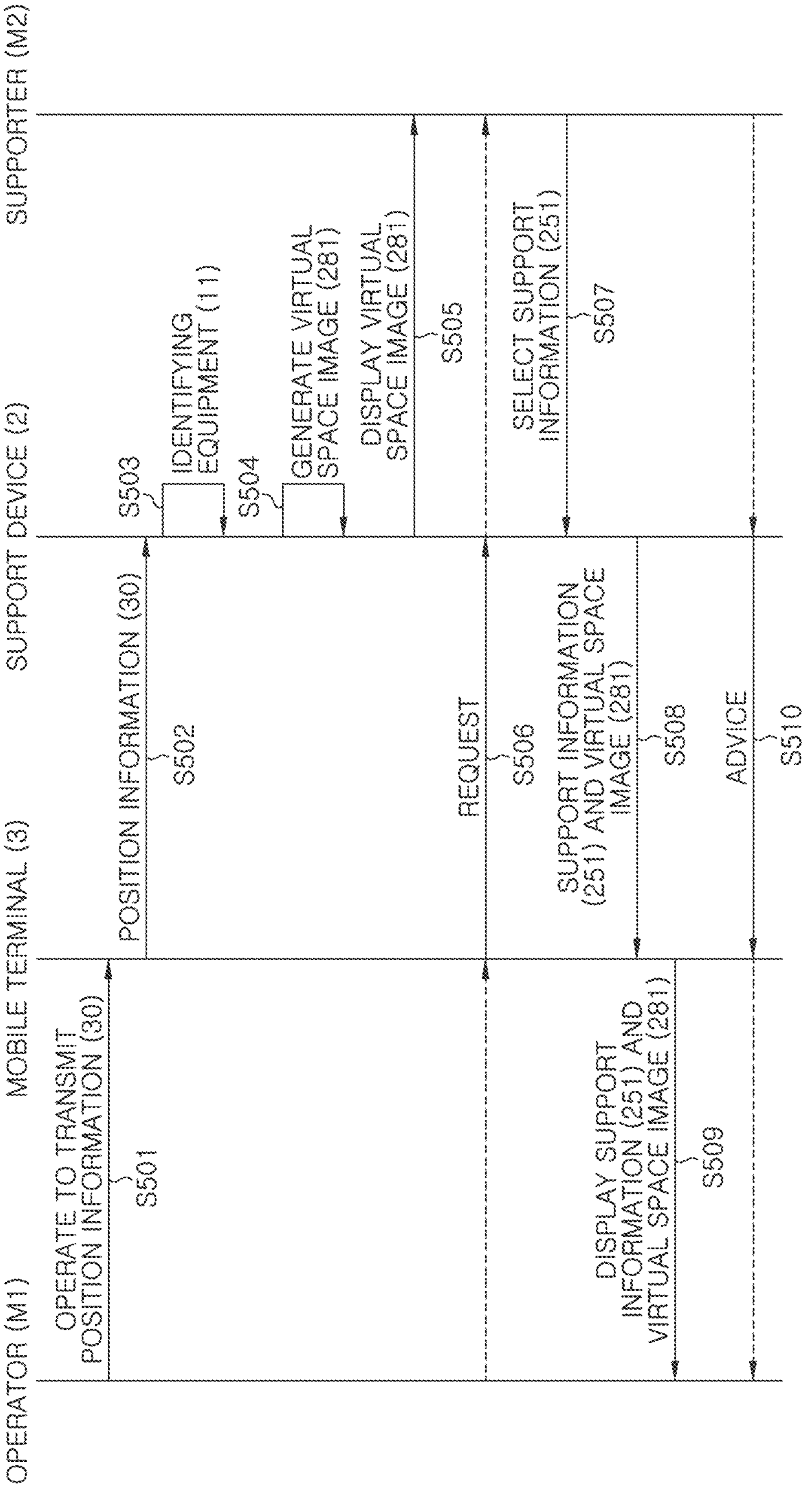
FIG. 5 is a sequence diagram showing an example of a sequence executed in the support system shown in FIG. 1.

FIG. 5 is a sequence diagram showing an example of a sequence executed by the support system shown in FIG. 1. As shown in FIG. 5, in step S501, the operator M1 operates the transmission operation part 331 of the mobile terminal 3. Accordingly, in step S502, the CPU 31 of the mobile terminal 3 operates the terminal-side transmitting part 38 to transmit the position information 30 to the support device 2.

In step S503, the receiving part 26 of the support device 2 receives the position information 30. The CPU 24 causes the identifying part 241 to identify the equipment 11 to be subjected to maintenance based on the position information 30 received by the receiving part 26 and the arrangement information 252 in the storage part 25. Here, the equipment 11 identified by the identifying part 241 is the equipment 11A. In step S504, the CPU 24 generates the virtual space image 281 that imitates the equipment 11A in the actual factory 10 based on the position information 30, the arrangement information 252, and the specification information 253. In step S505, the CPU 24 operates the display part 22 to display the virtual space image 281 to the supporter M2. Accordingly, the supporter M2 can recognize the maintenance target is the equipment 11A.

In step S506, the operator M1 requests the supporter M2 to provide the support information 251 required for the maintenance of the equipment 11A via the microphone 34 of the mobile terminal 3.

In step S507, in response to the request from the operator M1 (mobile terminal 3), the supporter M2 selects the support information 251 that is optimal for the current maintenance of the equipment 11A from the manual and the maintenance history of all the support information 251. In step S508, the CPU 24 of the support device 2 operates the transmitting part 27 to transmit the support information 251 selected in step S507 and the virtual space image 281 generated in step S504. Further, the support information 251 is transmitted in the form of an image that can be displayed on the mobile terminal 3 or in the form of information that can be sounded.

In step S509, the CPU 31 of the mobile terminal 3 operates the display part 33 to display the support information 251 and the virtual space image 281 to the operator M1. In some cases, the CPU 31 causes the speaker 35 to output the support information 251 in the form of sound. Accordingly, the operator M1 can obtain the support information 251, and quickly perform the maintenance of the equipment 11A.

If necessary, in step S510, the supporter M2 can provide advice that supplements the support information 251 to the operator M1 via the microphone 232 of the support device 2. The advice may be information that is not easily expressed in text or drawings, for example. Accordingly, the operator M1 can more quickly perform the maintenance of the equipment 11A.

As described above, in the support system 1, the equipment 11 that is the current work target can be identified among the multiple pieces of equipments 11 without requiring an image of the equipment 11, and the support information 251 suitable for the operation for the equipment 11 can be provided to the operator M1. Accordingly, the operation for the equipment 11 can be appropriately supported even if the image acquisition of the equipment 11 in the factory 10 is prohibited.

Since the support system 1 does not require an image of the equipment 11 to identify the equipment 11 as described above, the security in the factory 10 can be maintained. In other words, the leakage of confidential information can be prevented. Further, since the effort of capturing images can be eliminated, the support information 251 can be provided quickly.

While the preferred embodiments of the present disclosure have been described, the present disclosure is not limited to the above-described embodiments, and various modifications and changes can be made within the scope of the gist of the disclosure. In the present embodiment, the equipment 11 is a prober. However, the equipment 11 is not limited thereto, and may be a film forming device, an etching device, or the like used for manufacturing semiconductor device, for example.

In the present embodiment, the operation for the equipment 11 is the maintenance of the equipment 11. However, the operation for the equipment 11 is not limited thereto, and may be maintenance training that imitates the maintenance of the equipment 11, for example. Accordingly, the support system 1 (the support device 2) can be used for maintenance education for the operator M1. When the support system 1 is used for maintenance education, the operator M1 can wear VR goggles that display the virtual space image 281 and perform maintenance training. Further, tools for maintenance are additionally displayed in the virtual space image 281.

In the present embodiment, the support information 251 is provided to the operator M1 by the operation of the support device 2 by the supporter M2. However, the present disclosure is not limited thereto. For example, when artificial intelligence is incorporated in the support device 2, the support information 251 may be provided by the operation of the support device 2 by the artificial intelligence. In this case, for example, the CPU 24 of the support device 2 has a trained model configured to output the support information 251 when the specifications of the equipment 11, the installation environment, the current situation, and the like are inputted. Further, it is preferable that the artificial intelligence has an automatic voice recognition function that recognizes the voice of the operator M1. Accordingly, the artificial intelligence can determine the content of the request from the operator M1 and provide advice in response to the request.

In the present embodiment, the information obtained from the GPS 36 of the mobile terminal 3 is used as the position information 30. However, the present disclosure is not limited thereto. When the mobile terminal 3 has therein an acceleration sensor or a gyro sensor, the information obtained from the sensor can be used.

This application claims priority to Japanese Patent Application No. 2022-127190 filed on Aug. 9, 2022, the entire contents of which are incorporated herein by reference.

What is claimed is:

1. A support device for supporting an operation performed on an equipment, comprising:

a receiving part configured to receive position information related to a position of the equipment, which is transmitted from a device of an operator who performs the operation on the equipment;

a storage part configured to store arrangement information on an arrangement of multiple pieces of the equipment arranged in a factory, and specification information indicating specifications of each equipment;

an identifying part configured to identify the equipment based on the position information received by the receiving part and the arrangement information stored in the storage part, without using an image of the equipment to identify the equipment;

an image generating part configured to generate a virtual space image that imitates the equipment in an actual factory based on the position information, the arrangement information, and the specification information, wherein the image generating part generates the virtual space image such that the equipment identified by the identifying part is represented in detail, and other equipment adjacent to the identified equipment is represented in simplified; and a transmitting part configured to transmit the virtual space image and support information suitable for supporting the operation for the equipment to the device of the operator who performs the operation on the equipment identified by the identifying part.

2. The support device of claim 1, wherein the image of the equipment is represented with solid lines, and the image of the other equipment is represented with dashed double-dotted lines.

3. The support device of claim 1, further comprising:

a display part configured to display the virtual space image.

4. The support device of claim 1, wherein the support information includes at least one of a manual for the equipment that includes at least one of an operation procedure manual and a specification for the equipment, and a history of a defect of the equipment and a history of measures for solving the defect.

5. The support device of claim 4, wherein the support information is selected between the manual and the history in response to a request from the device of the operator who performs the operation on the equipment.

6. The support device of claim 1, wherein the operation is maintenance of the equipment or maintenance training that imitates the maintenance.

7. A support system comprising:

a support device that supports an operation for an equipment; and a mobile terminal that communicates with the support device, wherein the support device includes:

a receiving part configured to receive position information on a position of the equipment;

a storage part configured to store arrangement information on an arrangement of multiple pieces of the equipment arranged in a factory, and specification information indicating specifications of each equipment;

an identifying part configured to identify the equipment based on the position information received by the receiving part and the arrangement information stored in the storage part, without using an image of the equipment to identify the equipment;

an image generating part configured to generate a virtual space image that imitates the equipment in an actual factory based on the position information, the arrangement information, and the specification information, wherein the image generating part generates the virtual space image such that the equipment identified by the identifying part is represented in detail, and other equipment adjacent to the identified equipment is represented in simplified; and a transmitting part configured to transmit the virtual space image and support information suitable for supporting the operation for the equipment identified by the identifying part, and the mobile terminal includes:

a terminal-side transmitting part configured to transmit the position information to the receiving part;

a terminal-side receiving part configured to receive the support information from the transmitting part; and a notifying part configured to notify the support information received by the terminal-side receiving part in a form of at least one of an image and a voice.

8. The support system of claim 7, wherein the mobile terminal includes an operation part that performs a transmission operation when the position information is transmitted from the terminal-side transmitting part.

9. The support system of claim 7, wherein position information of the mobile terminal is used as the position information.

10. The support system of claim 9, wherein the position information of the mobile terminal is position information acquired from a global positioning system (GPS).

11. A support method for supporting an operation for an equipment, comprising:

a storing step of storing arrangement information on an arrangement of multiple pieces of the equipment arranged in a factory, and specification information indicating specifications of each equipment;

a receiving step of receiving position information related to a position of the equipment, which is transmitted from a device of an operator who performs the operation on the equipment;

an identifying step of identifying the equipment based on the position information received in the receiving step and the arrangement information, without using an image of the equipment to identify the equipment;

an image generating step of generating a virtual space image that imitates the equipment in an actual factory based on the position information, the arrangement information, and the specification information, such that the equipment identified in the identifying step is represented in detail, and other equipment adjacent to the identified equipment is represented in simplified; and a transmitting step of transmitting the virtual space image and support information suitable for supporting the operation for the equipment to the device of the operator who performs the operation on the equipment identified in the identifying step.

* * * * *